Aug. 8, 1961 F. C. THOMPSON 2,995,713

UHF TUNER

Filed March 25, 1958

INVENTOR.
FRED C. THOMPSON
BY Mitchell & Bechert
ATTORNEYS

United States Patent Office 2,995,713
Patented Aug. 8, 1961

2,995,713
UHF TUNER

Fred C. Thompson, State College, Pa., assignor, by mesne assignments, to HRB-Singer, Inc., State College, Pa., a corporation of Delaware
Filed Mar. 25, 1958, Ser. No. 723,857
5 Claims. (Cl. 330—56)

This invention relates to tuned circuits and more particularly to variable tuned circuits in the ultra-high frequency signal region.

In the electronics, communication and radar arts, tuned circuits (with amplifiers) are used to receive and amplify signals of a predetermined frequency and to reject all other signals. The selectivity of these circuits is dependent upon how sharply the tuned circuit can discriminate between signals of the predetermined frequency and signals having frequencies approaching the predetermined frequency. The degree of selectivity is a function of the "Q," or ratio between the reactive and resistive elements in the circuits; the smaller the resistive elements, the higher the selectivity. A second important application of tuned circuits in the electronics arts is associated with vacuum tube oscillators. Here the tuned circuit controls the frequency at which oscillations occur.

Basically, the tuned circuit employed in tuned amplifiers and oscillators is a parallel combination of an inductance and a capacitance. At one frequency, the resonant frequency of the tuned circuit, the inductive and capacitive reactances cancel, and the impedance of the combination is a maximum. Signals received at this frequency are greatly amplified, while signals of other frequencies are rejected or weakly amplified.

The resonant frequency of the tuned circuit is inversely proportional to the square root of the product of the inductance and the capacitance in the parallel combination. Thus, to increase the resonant frequency it is necessary to decrease the values of the capacitors and inductors. When employing lumped-parameter capacitors and inductors, a limit is reached when the lumped parameter capacitor is completely removed and the lumped-parameter inductor is reduced to a single turn of wire. The resonant frequency of a circuit comprising only the interelectrode capacity of a vacuum tube and the inductance of the single turn of wire may still be below a desired resonant frequency.

To obtain higher resonant frequencies, it is necessary to use a resonant transmission line. The length of the resonant transmission line can be adjusted to present an inductive reactance to a signal source. In general, the resonant transmission line when coupled to a vacuum tube provides an inductive reactance for resonating with the vacuum tube's interelectrode capacity. The inductances obtainable from a resonant transmission line are much smaller than from a single turn of wire, and hence the resonant frequency of a circuit including such an element is correspondingly higher. Furthermore, such a transmission line has a high "Q," permitting sharp selectivity.

One of the more common transmission-line techniques involves the use of the well-known two parallel wire transmission line as an inductor. The inductance is varied by moving a bar which provides a short-circuited connection between the two wires along the length of the line. As the length of the line varies, the inductance varies and, therefore, the resonant frequency of the circuit which includes the transmission line varies.

Although this technique is useful, it suffers from two drawbacks which in many applications are serious. A two-wire transmission line is completely unshielded and therefore radiates energy in all directions like an antenna.

Not only does this result in a loss of available power, but also the radiated energy may create interferences in nearby equipment. The second undesirable feature is related to the shorting bar. Since there is a slidably mechanical connection between the shorting bar and the wire it is possible for mechanical vibration to cause a momentary break in the electrical contact. Such momentary loss of contact introduces undesirable signal transients which limit the reliability of the apparatus.

The radiation problem can be solved by using conventional coaxial transmission lines since the outer conductor of the coaxial transmission line also serves as a radiation shield; however, in such structures, the problem of changing the length of the line to vary the inductance becomes complicated. In general, plungers or stubs are coupled along the line to change its effective length. Such plungers and stubs are complicated mechanical structures which of necessity are overly large and unwieldy in range of 200 to 1000 megacycles.

It is therefore an object of the invention to provide an improved variable frequency circuit element that is tunable at ultra-high frequencies.

It is another object of the invention to provide an improved ultra-high frequency tuning element which is relatively small and continuously variable over an extended range of frequencies, specifically, at least over an octave.

It is a further object of the invention to provide an improved ultra-high frequency tuning element employing a transmission line which has a minimum of radiation losses and which avoids electrical transients due to mechanical vibration of contacting elements.

It is a specific object to achieve the above objects with a moving-plate type of variable capacitor, whereby a large tuning range is achievable.

Other objects, features and advantages of the invention will be evident from the following detailed description when read in connection with the accompanying drawings. In said drawings, which show, for illustrative purposes only, a preferred form of the invention:

Briefly, the invention contemplates an improved ultra-high frequency tuner in which variable tuning does not involve mechanical contact between moving parts. The apparatus comprises a transmission line which includes first and second conductors, and the transmission line provides the inductive reactance for a tuned circuit. A third conductor is cooperatively disposed with respect to the first and second conductors to provide a capacitive reactance for the tuned circuit. Means are included for varying the operative disposition of the third conductor to permit a variation of the capacitive reactance in the tuned circuit.

An advantage of the apparatus is the combined use of the conductors of the transmission line in providing for both the capacitive and inductive reactances, thus leading to a more compact assemblage.

Figure 1:
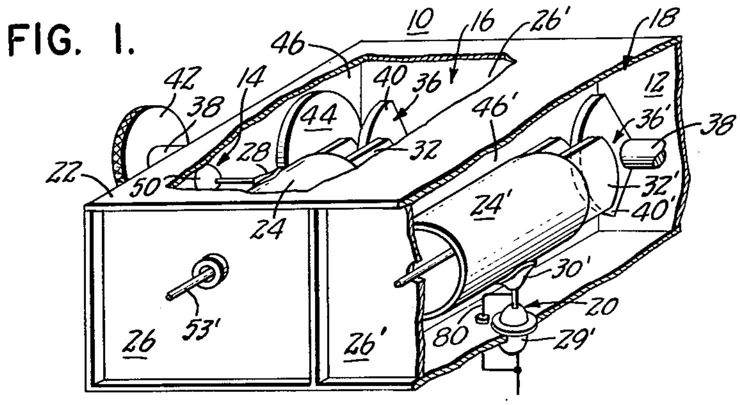
FIG. 1 is a partly broken-away perspective view of a portion of an ultra-high frequency tuner employing transmission lines as variable frequency tuning elements in accordance with a preferred embodiment of the invention.

FIG. 1 shows the tuned amplifier section 10 and the oscillator section 12 of an ultra-high frequency tuner of my invention. The tuned amplifier 10 includes a vacuum tube 14 of the planar-triode type and a transmission line 16 of the coaxial type. Abutting the tuned amplifier 10 is the coaxial transmission line 18 and the planar triode 20 of the oscillator 12.

The transmission line 16 has an outer conductor 22 of rectangular cross section encompassing an inner conductor 24, which although shown in circular cross section may also be of rectangular cross section. A conductor 26 not only completely encloses the receiving end of the transmission line 16 (to mimimize end-fire radiation) but also short-circuits the outer conductor 22 to the inner conductor 24; the transmission line 16 is thus of the closed-end type. At the sending end of the transmission line 16, the inner conductor 24 is coupled by a feed-through capacitor 28 to the anode 30 of the vacuum tube 14 which passes through the outer conductor 22. Extending beyond the sending end of transmission line 16 are a plurality of parallel conducting plates 32 electrically and mechanically tied to the inner conductor 24 to form the stator of a variable rotary capacitor 36.

The shaft 38 passing through the transmission lines 16 and 18 provides rotatable support for a plurality of parallel conducting plates 40 which interleave the plurality of parallel conducting plates 32 and which form the rotors of the variable rotary capacitor 36. By controlling the geometry of both pluralities of conducting plates 32 and 40, a smoothly varying capacitive coupling between the stators and the rotors may be obtained when the shaft 38 is rotated, as by means of the knob 42. In order to complete the connection of capacitor 36 to the outer conductor 22 and at the same time to insure that the variable capacity is only between the conducting plates 32 and 40, a circular disc 44 is mounted on the shaft 38 in capacity-coupled close proximity with each lateral wall 46—46′ of the outer conductor 22. Thus capacitor 36 provides two parallel variable capacitance connections across transmission line 10.

The parallel-resonant or tank circuit is completed by transmission line 10, and the length of line 10 determines the general frequency range of resonance. Since the transmission line 10 is short-circuited at the receiving end, the length of the line is preferably chosen to be less than a quarter of the operating wavelength of the highest frequency being amplified. A short-circuited transmission line has the property of appearing as an inductance when its length is less than a quarter of the operating wavelength of the signals exciting the line. Although, it is true that the same line acts as an inductance for longer lengths, the quarter wavelength is to be preferred since it is the shortest-length line which acts as an inductor. Thus, the transmission line 10 provides an inductance which is in parallel with the variable capacitor 36 formed from the pluralities of interleaved conducting plates 32 and 40. The magnitude and range of the variable capacitor 36 can be increased to any desired value by increasing the number of conducting plates, as will be understood.

It should be noted that several advantages occur from the use of a parallel-resonant circuit of this type. There is little or no radiation when the outer conductor 22 is grounded, since all electromagnetic fields are constrained within the enclosure defined by the outer conductor 22 and the conductors 26 and 26′. The selectivity of the circuit is extremely sharp, since the "Q" of the transmission line 10 is very high, particularly when the surfaces of the conductors are silver-plated. In addition, a desired octave tuning range is easily achieved since the range required of the variable capacitors is readily obtainable.

It should be noted that it is possible to replace the inner conductor 24 (which is shown in circular cross section) with an inner conductor of rectangular cross section without introducing any detrimental effects in the transmission-line characteristics. The walls of such a conductor can then serve as the stators of a variable capacitor and the conductor plates are not required. The rotors are then positioned in the space between the inner and outer conductors.

Figure 2:
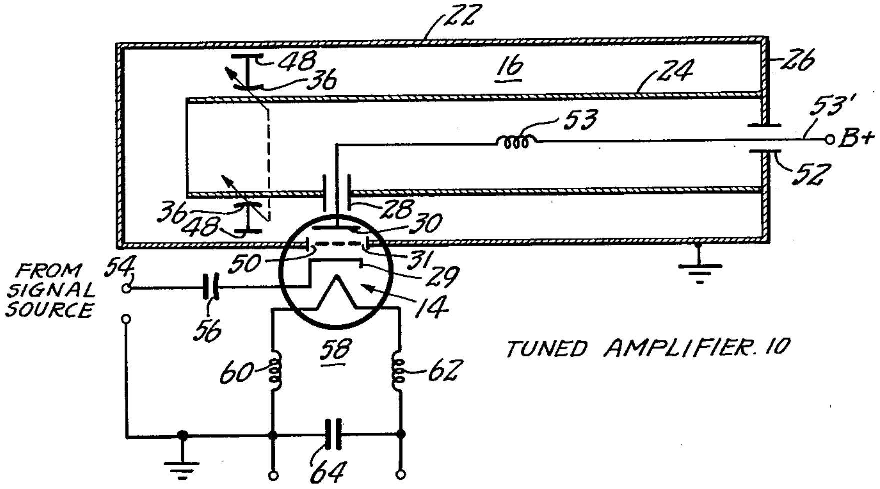
FIG. 2 is a schematic diagram of the tuned-amplifier portion of the ultra-high frequency tuner of FIG. 1.

In FIG. 2, the schematic representation of the tuned amplifier 10 is shown in a grounded control-grid configuration. At ultra-high frequencies, grounded control-grid configurations are advantageous, and in the particular embodiment which employs a planar type vacuum-tube triode there are added advantages. The vacuum tube 14 is mounted in a port 50 of the grounded outer conductor 22 of the transmission line 16, with the control grid 31 directly coupled to the outer conductor 22. Thus, there is complete isolation between the anode and cathode circuits of the vacuum tube 14.

The resonant circuit, comprising the transmission line 16 in parallel with the serially connected variable capacitors 36 and fixed capacitors 48, constituted by the disc 44 and the wall 46, is disposed between the anode 30 of the vacuum tube 14 and ground (the feed-through capacitor 28 radio-frequency couples the anode 30 to the inner conductor 24, and the outer conductor 22 is grounded). Plate power is supplied from the positive voltage supply B+ through the inner conductor of a feed-through capacitor 52 via a radio-frequency choke 53 and lead 53″ within the inner conductor 24, through the inner conductor of the feed-through capacitor 28, to the anode 30. Thus, the D.-C. voltage fed to the anode 30 is isolated from the inner conductor 24, and the radio-frequency signals on the anode 30 pass to the transmission line 16 and not back into the direct-current power supply.

The cathode 29 receives the radio-frequency signals to be amplified, signals being impressed between the input terminal 54 and ground. The signals pass through the direct-current blocking capacitor 56 and are applied to the cathode 29. The filament circuit 58 is a conventional ultra-high frequency configuration with radio-frequency chokes 60 and 62, and a radio-frequency by-pass capacitor 64 to minimize the effects of the ultra-high frequencies on the filament circuit.

The amplified signals are transmitted to a load circuit in either of two conventional manners. A slot may be cut in the outer conductor 22 to permit radiation of the amplified signal to a load circuit, or a radio-frequency probe connected to the load circuit is inserted through a port in the outer conductor 22.

Figure 3:
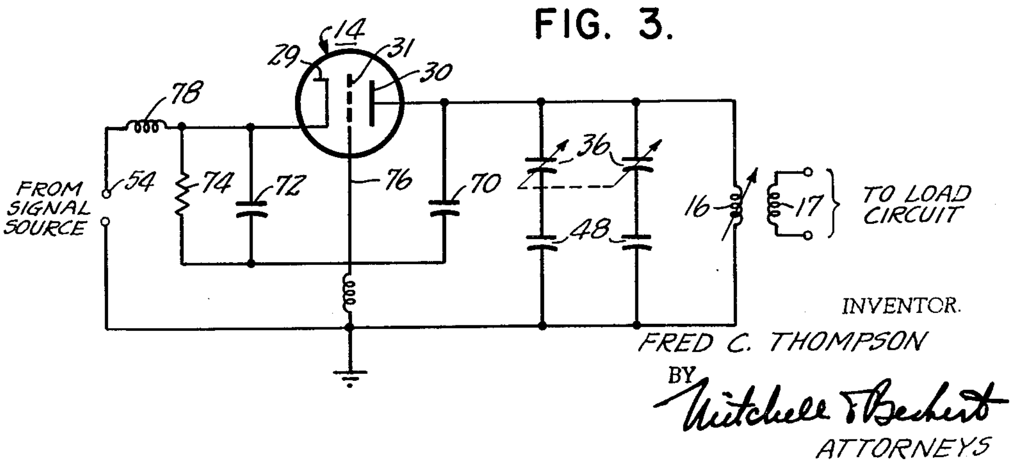
FIG. 3 is an equivalent-circuit diagram of the tuned amplifier of FIG. 2.

FIG. 3 presents the equivalent circuit of the tuned amplifier 10, and to the extent possible previous reference characters are employed to indicate function of the components. The transmission line 16 is shown as a variable inductor 16 since its inductance changes with frequency. The inductor 17 coupled to the variable inductor 16 is equivalent to a slot cut in the outer conductor 22. The variable capacitors 36 in series with the fixed capacitors 48 are in shunt with variable inductor 16 to form the resonant circuit, loading the anode 30 of the vacuum tube 14. The capacitor 70 represents the ever-present output capacity associated with all vacuum-tube circuits, while the capacitor 72 represents the ever-present input capacity. These capacities result basically from the geometry of the electrodes of the vacuum tube. The inductors 76 and 78 represent the inductances associated with the cathode and control-grid leads and structures, and the resistor 74 represents the normal loading of the input circuit of a vacuum tube on the signal source. Thus, the equivalent circuit of FIG. 3 shows the role of the components of the schematic diagram of FIG. 2.

It will be recalled that FIG. 1 merely shows the tuned amplifier 10 and a portion of an oscillator 12. The oscillator 12 is similar in construction to the tuned amplified 10 with two exceptions. A feedback probe 80 couples the anode 30′ to the cathode 29′ of the vacuum tube 20. Secondly the shape, coupling, and number of conducting plates 32′ and 40′ may be different.

A mixer circuit of similar configuration may be located next to the oscillator 12 to form a complete ultra-high frequency tuner comprising an ultra-high frequency amplifier, a local oscillator, and mixer elements. A common shaft is desirable to permit simultaneous rotation of the rotors of the three elements, for ganged tuning. The signal coupling between the elements can be accomplished by the use of slots between (i.e. in) the walls of the outer conductors or by the use of radio-frequency probes.

Thus, a tuning element employing a resonant transmission line has been shown which has sharp selectivity over a broad range of ultra-high frequencies. The tuning element (by virtue of the enclosed outer conductor of the transmission line) scarcely radiates energy. There is also little possibility of the introduction of transient noise during tuning since all electrical connections are mechanically rigid and the capacity variations are accomplished by rotating elements which are only capacitively coupled via air gaps to stator elements.

There has also been shown a compact tuned amplifier of small size (in a working model a complete tuner comprising an amplifier, oscillator and mixer has a volume of less than sixty cubic inches), which fully utilizes the high frequency qualities of a planar triode.

While the invention has been described in detail in connection with the preferred form illustrated, it will be understood that modifications may be made without departing from the spirit or scope of the invention as defined in the claims which follow.

I claim:

1. A variable frequency tuning element comprising a transmission line, said transmission line having an outer conductor of rectangular cross section and an inner conductor, said outer conductor having a first end extending beyond a corresponding first end of said inner conductor, first planar conducting means conductively connected to and extending beyond said first end of said inner conductor, said first planar conducting means comprising first and second plates disposed side-by-side and parallel to one wall of said outer conductor, second planar conducting means disposed between said first and second plates in parallel relationship, conductive rotating means for rotating said second planar conducting means about an axis perpendicular to the plane of said wall to vary the capacitive coupling between said first and second planar conducting means, and a third conductive plate electrically connected to said rotating means and mounted a predetermined distance from said wall to form a fixed capacitor therewith, whereby energy is transmitted between said inner and outer conductors over said first and second planar conducting means and said third plate.

2. The apparatus of claim 1, wherein said outer conductor comprises a second end which is completely closed.

3. The apparatus of claim 1, wherein the rotating means includes a shaft to which said second planar conducting means is connected, said shaft extending through the wall of said outer conductor.

4. The apparatus of claim 3, wherein said outer conductor comprises a second end which is closed and connected to a second end of said inner conductor.

5. The apparatus of claim 3 wherein said first and second plates define a plurality of spaced parallel finlike conducting elements and said second planar conducting means comprises a second plurality of spaced finlike conducting elements, said first and said second plurality of elements being interleaved.

References Cited in the file of this patent

UNITED STATES PATENTS

| | | |
|---|---|---|
| 2,246,928 | Schick | June 24, 1941 |
| 2,530,089 | Smith | Nov. 14, 1950 |
| 2,557,969 | Isely | June 26, 1951 |
| 2,591,316 | Strutt | Apr. 1, 1952 |
| 2,795,699 | Belash et al. | June 11, 1957 |
| 2,853,614 | Nilssen | Sept. 23, 1958 |